United States Patent

Von Starck

[15] 3,645,646

[45] Feb. 29, 1972

[54] ELECTROMAGNETIC PUMP OR CONVEYOR TROUGH

[72] Inventor: Axel Von Starck, Remscheid-Luttringhausen, Germany

[73] Assignee: AEG-Elotherm GmbH, Remscheid-Hasten, Germany

[22] Filed: Feb. 12, 1970

[21] Appl. No.: 10,793

[30] Foreign Application Priority Data

Feb. 12, 1969 Germany..................P 19 06 922.8

[52] U.S. Cl..................................................417/50
[51] Int. Cl........................................C21b 7/14, F27b 3/18
[58] Field of Search..................417/50; 222/70; 198/41; 266/38

[56] References Cited

UNITED STATES PATENTS

| | | | |
|---|---|---|---|
| 2,865,291 | 12/1958 | Cuatt | 417/50 |
| 3,045,599 | 7/1962 | Carlson, Jr. et al. | 417/50 |
| 3,052,097 | 9/1962 | Tyrner | 417/50 |
| 3,534,886 | 10/1970 | Von Starch | 222/70 |

Primary Examiner—William L. Freeh
Attorney—Cushman, Darby & Cushman

[57] ABSTRACT

An electromagnetic pump or conveyor trough for generating a traveling magnetic field by means of current carried by conductors mounted in slots in the bottom of the trough to move an electrically conductive liquid wherein a first hollow tubular conductor having its bore eccentrically offset toward the bottom of the slot and a second hollow tubular conductor with a height which does not substantially exceed the electromagnetic penetration depth are mounted atop each other in each slot with the second conductor nearest the open end of the slot.

11 Claims, 3 Drawing Figures

Inventor:
AXEL VON STARCK

ELECTROMAGNETIC PUMP OR CONVEYOR TROUGH

This invention relates to electromagnetic pumps or conveyor troughs which employ a travelling magnetic field to drive an electrically conductive liquid, such as a metal melt, along a trough. The field induces an electric current in the conducting liquid and this current interacts with the travelling magnetic field to generate electromotive forces in the conducting liquid which cause the liquid to move along the trough.

The travelling magnetic field is conventionally produced by one or more inductors which, in principle, can be regarded as linear developments of the stator of a conventional alternating current motor which has been cut open on one longitudinal side. Further, these inductors conventionally consist of a flat, elongated, laminated and slotted sheet iron core and a polyphase winding of electrically conducting material which is inserted into the open slots of the laminated core so as to be electrically insulated from the core.

The purpose of the polyphase winding is to carry a polyphase alternating current when the inductor is in operation and to generate a magnetic field which is guided by the magnetically permeable core. The several phase sections of the polyphase winding are in conventional manner spatially distributed along the core so that a travelling magnetic field is produced.

Usually the employment of such inductors for electromagnetic pumps and conveyor troughs requires a very high current density in the conductors of the polyphase winding. This high current density results in the conversion of electricity into considerable amounts of heat according to Joule's Law and this heat normally must be removed by cooling the conductors in some fashion. Because of this heating problem the polyphase winding is usually built up of hollow tubular electrical conductors through which a coolant, for example air or water, can be circulated.

For electrical and design reasons it is advantageous to insert two such tubular conductors, insulated from each other and one above the other, into each slot of the laminated core, the bottom conductor in the slot being a direct continuation of the upper conductor of another slot. Conventionally the bottom and the upper conductors in each slot were tubes having the same cross-sectional configuration. However if two tubular conductors in a slot, one above the other, carry an alternating electric current, at least two electrical phenomena of interest occur. First, because of the alternating magnetic field which is generated by the electrical current in the tubular conductors themselves, and which lies across the slot, the current in the conductors is displaced towards the open side of the slot. The extent of this displacement may be calculated, and depends upon the frequency of the current and the material from which the conductors are made. Further, this displacement is determined by the so-called electromagnetic penetration depth, which is expressed in units of length and which represents the thickness of the layer below the conductor surface in which the entire current may be thought to flow in uniform distribution. For copper at room temperature conducting current at a frequency of 50 c./s. the penetration depth is about 1 centimeter. The displacement of the current reduces the available conductor cross section for carrying current and thus leads to increased heat production.

Second, the tubular conductor nearest the open side of the slot is exposed to the alternating magnetic field produced by the conductor in the bottom of the slot. This field transversely crosses the slot and induces additional eddy currents in the upper conductor. These eddy currents cause further resistive heating.

It is the object of the invention to geometrically design the two tubular conductors in each slot of the laminated sheet iron core of an electromagnetic pump or conveyor trough so that the hereinbefore described unfavorable effects which reduce the electrical efficiency of the arrangement are minimized. According to the invention this is achieved by providing the two conductors with different cross sections, the conductor at the bottom of the slot having a bore which is eccentrically displaced towards the bottom of the slot. Furthermore, it is proposed that the height of the tubular conductor near the open side of the slot should be so limited that it does not substantially exceed the electromagnetic penetration depth. By the selection of these special cross sections for the conductors, the electrical efficiency of a trough provided with such conductors is considerably better than troughs having conductors of identical cross section. Although current displacement still occurs, the current density in any part of either of the two conductors does not become excessive, nor are eddy currents induced in the upper conductor to the extent as in conventional troughs with conductors of identical cross section.

The invention is further elucidated in the following description and illustrated in the accompanying drawing of which:

Figure 1:
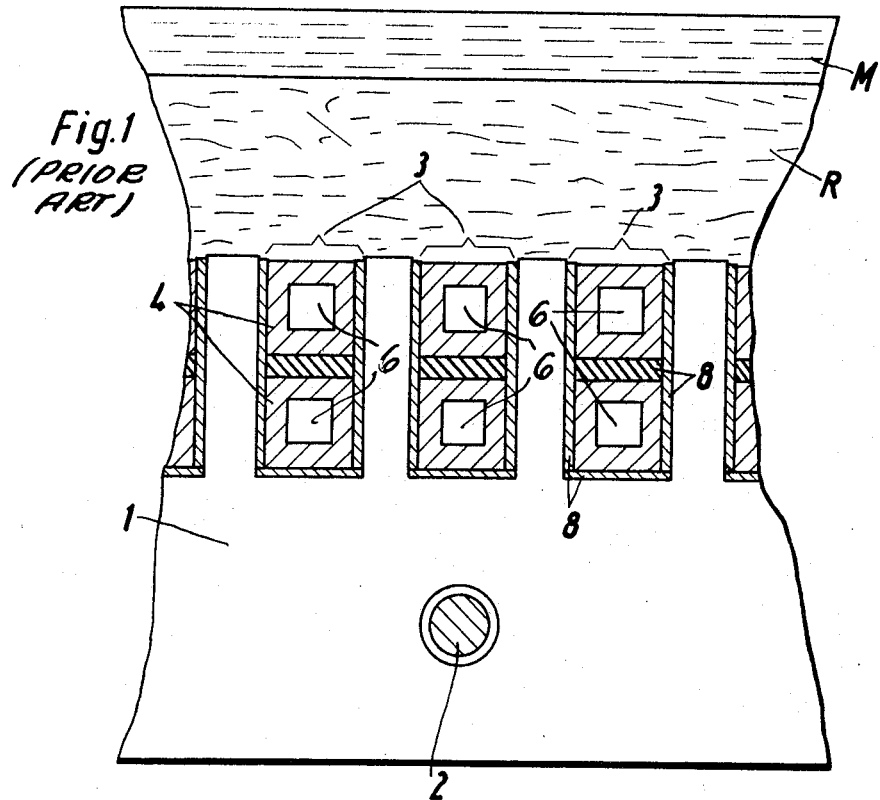
FIG. 1 is a longitudinal section of the prior art electromagnetic pump or conveyor trough with conductors having identical cross sections.

Referring to FIG. 1, the laminated sheet iron core 1 is held together by tie bolts 2 and is located below a trough R which is preferably made of refractory material in which the liquid metal M is conveyed. Each of the slots 3 in the laminated core 1 conventionally contains two hollow tubular conductors 4 which have identical cross sections. The conductors each have a substantially square bore 6 and are electrically separated from each other and from core 1 by an interposed insulation 8. The disadvantages of this arrangement are pointed out above.

Figure 2:
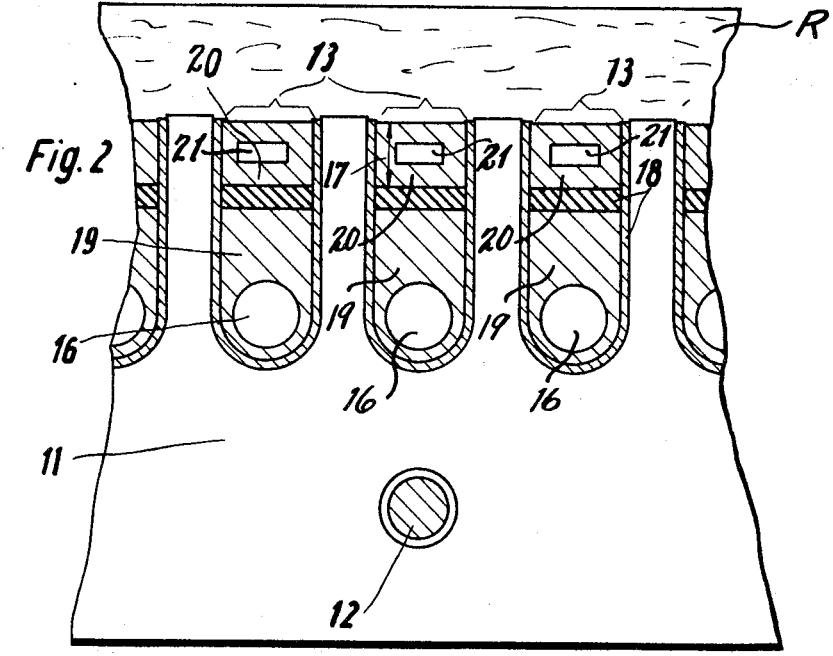
FIG. 2 is a longitudinal section of an arrangement according to this invention.

FIG. 2 shows a similar section of a trough equipped with hollow tubular conductors 19 and 20 in each slot 13 of core 11. The core 11 and slots 13 are preferably of the same material as the core 1 and slots 3 in FIG. 1, and as in FIG. 1, core 1 is held together by tie bolts 12. However, in contrast to FIG. 1, the bore 16 of conductor 19 is not centrally located but rather the circular bore 16 of the conductor 19 at the bottom of slot 13 is eccentrically displaced towards the bottom of slot 13. Further, the conductor 19 and slot 13 both have a rounded bottom in contrast to the flat bottom in FIG. 1. Moreover, the height 17 of conductor 20, measured in the direction of the depth of the slot, is limited so that it does not substantially exceed the electromagnetic penetration depth and is substantially less than the height of conductor 19. Conductor 19 also has a bore 21 which is smaller than the bore 4 in FIG. 1 and which has a rectangular cross section.

Accordingly, the cross sections of the conductors 19 and 20 are not identical as in the prior art embodiment of FIG. 1 and the above-mentioned problems which resulted from the use of conductors as in FIG. 1, are substantially alleviated by these specific cross-sectional configurations. It should be apparent that while both configurations are preferably used, either can be employed by itself.

Figure 3:
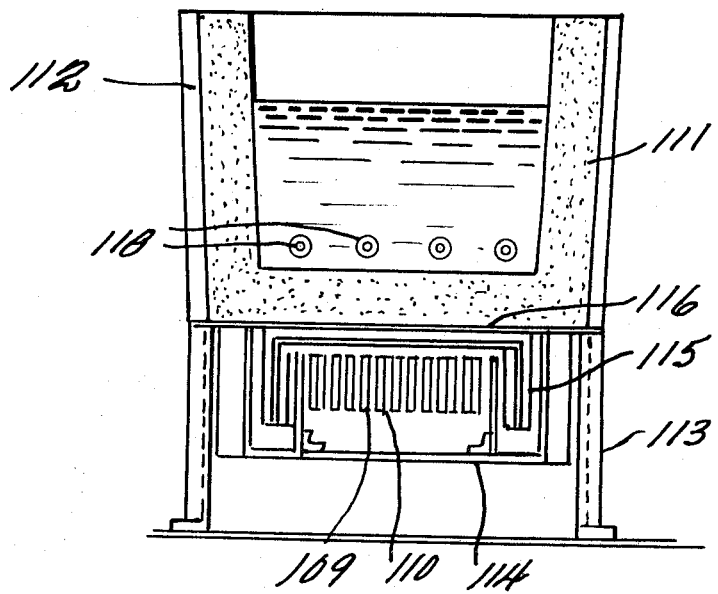
FIG. 3 is a cutaway view of a furnace body with a travelling field conductor according to this invention serving as an agitating coil.

FIG. 3 illustrates a cutaway view of a furnace body with a traveling field inductor according to this invention serving as an agitating coil. Furnace 100 includes a self-supporting fire resistant setting 111, which, as is customary, is enclosed by a furnace wall 112, and which rests on a furnace frame 113. Below the floor of the setting 111, and mounted in the frame 113, is the traveling field inductor shown in cross section with its stack of sheets 114 and conductors 109 and 110, which are connected with the inductor winding in the winding head 115. Conductors 109 and 110 are disposed in the sheets in the fashion shown in detail in FIG. 2. In order to avoid destruction of the induction winding through emergence of the liquid metal in the case of breakthrough of the fire-resistant setting 111, partition 116 made of nonmagnetic material is disposed between the bottom of the setting 111 and the inductor, the partitioning sheet on its part being preferably separated from the inductor by a layer made of insulated material.

To move the metal melt 117 located in the furnace body, the inductor is switched, for example, in such a way that it produces an electromagnetic traveling field progressing perpendicularly out of the plane of the drawing. In the area of the penetrating depth of this traveling field, a current in the same direction is produced in the metal melt 117, said current having been indicated by 118, and which induces in the remaining areas of the melt a backflow in approximately the opposite direction. Because of the effect produced by the wall of the furnace setting, additional flow components are produced thereby in such a way that altogether a very effective agitation of the metal melt 117 will be achieved.

Many modifications and changes in the embodiment of the invention illustrated in FIG. 2 can be made without departing from the scope of the invention. Accordingly, that scope is intended to be limited only by the scope of the appended claims.

Thus, with this novel arrangement, the magnetic field required for conveying the metal melt can be generated with the expenditure of a minimum amount of electrical power.

What is claimed is:

1. An electromagnetic conveyor for generating a travelling magnetic field so as to move an electrically conductive liquid in a cavity of a body which holds said liquid comprising:
   a core having a plurality of slots, each having an open end,
   a plurality of first tubular conductors each mounted in a slot and each having a bore and
   a plurality of second tubular conductors, each mounted in a slot below said first conductor so that each said first conductor is closer to the open end of the slot than the second conductor in the same slot and each said second conductor having a bore eccentrically offset from the center of said first conductor so as to be closer to the bottom of said slot than to the first conductor in said slot.

2. A conveyor as in claim 1 wherein the height of said first tubular conductors does not substantially exceed the electromagnetic penetration depth of said first conductors.

3. A conveyor as in claim 1 wherein the bores of said second conductors have a circular cross section.

4. A conveyor as in claim 1 including means for insulating the first and second conductors in each slot from each other and from said core.

5. A conveyor as in claim 1 including a trough of refractory material above said core.

6. A conveyor as in claim 1 wherein said first tubular conductors each have a bore of substantially rectangular cross section.

7. A conveyor as in claim 1, including said body and wherein said body is a trough made of refractory material.

8. A conveyor as in claim 1, including said body and wherein said body is a furnace.

9. A conveyor as in claim 1 wherein said core is laminated sheet iron.

10. A conveyor as in claim 9 including a tie bolt holding said laminated core.

11. An electromagnetic conveyor for generating a travelling magnetic field so as to move an electrically conductive liquid in a cavity of a body which holds said liquid comprising:
    a laminated sheet iron core having a plurality of slots, each having an open end,
    a plurality of first tubular conductors each mounted in a slot, each having a bore, and each having a height in said slot which does not substantially exceed the electromagnetic penetration depth of said first conductors,
    a plurality of tubular conductors, each mounted in a slot below said first conductor so that said first conductor is closer to the open end of the slot than the second conductor in the same slot and each said second conductor having a circular bore eccentrically offset from the center of said first conductor so as to be closer to the bottom of said slot than to the first conductor in said slot means for insulating said first and second conductors in each slot from each other and from said core.

* * * * *